United States Patent
Park et al.

(10) Patent No.: US 10,265,942 B2
(45) Date of Patent: Apr. 23, 2019

(54) METHOD OF FORMING TRANSPARENT 3D OBJECT

(71) Applicant: SEOUL NATIONAL UNIVERSITY R&DB FOUNDATION, Seoul (KR)

(72) Inventors: Sang Joon Park, Seoul (KR); Jin Wook Chung, Seoul (KR); Jin Mo Goo, Seoul (KR); Doo Hee Lee, Gwangmyeong-si (KR); Sang Youn Lee, Seoul (KR); Jung Hoon Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 205 days.

(21) Appl. No.: 15/149,426

(22) Filed: May 9, 2016

(65) Prior Publication Data
US 2016/0332388 A1 Nov. 17, 2016

(30) Foreign Application Priority Data

May 12, 2015 (KR) .................... 10-2015-0066240
Sep. 25, 2015 (KR) .................... 10-2015-0137097

(51) Int. Cl.
*B29C 33/52* (2006.01)
*B29C 70/68* (2006.01)
(Continued)

(52) U.S. Cl.
CPC .......... *B33Y 80/00* (2014.12); *B29C 33/3835* (2013.01); *B29C 33/3842* (2013.01);
(Continued)

(58) Field of Classification Search
CPC ............ B29C 33/3835; B29C 33/3842; B29C 2033/385; B29C 33/448; B29C 33/52;
(Continued)

(56) References Cited

U.S. PATENT DOCUMENTS

2008/0082301 A1* 4/2008 Haskell ................... G06F 17/50
                                                                703/1
2010/0041005 A1 2/2010 Campbell et al.
(Continued)

FOREIGN PATENT DOCUMENTS

DE 3437483 A1 4/1986
JP 07205157 A 8/1995
(Continued)

OTHER PUBLICATIONS

Korean Office Action dated Dec. 10, 2015.
Extended European Search Report for Application No. 16792826.6 dated Nov. 6, 2018.

*Primary Examiner* — Leo B Tentoni
(74) *Attorney, Agent, or Firm* — Cantor Colburn LLP

(57) ABSTRACT

A method of forming a transparent 3D object and a transparent 3D object formed by the method are provided. A transparent 3D object may be formed as follows. An internal structure of a 3D object is printed using a 3D printer based on a 3D image file having information about an internal region of the 3D object, and a mold, designed to form the 3D object and divided into at least two regions, is printed using the 3D printer based on the 3D image file. Then, the internal structure is combined with an inner region of the mold, and a transparent material is supplied to the mold. After the transparent material hardens, a transparent 3D object is obtained by removing the mold.

10 Claims, 11 Drawing Sheets

(51) Int. Cl.
| | |
|---|---|
| B29C 70/70 | (2006.01) |
| B29C 71/00 | (2006.01) |
| B33Y 80/00 | (2015.01) |
| B29C 64/171 | (2017.01) |
| B29C 64/182 | (2017.01) |
| B29C 33/38 | (2006.01) |
| B29C 64/176 | (2017.01) |
| B29C 45/14 | (2006.01) |
| B29C 64/188 | (2017.01) |
| B29C 64/106 | (2017.01) |
| B29C 64/112 | (2017.01) |
| B29C 64/118 | (2017.01) |
| B33Y 50/00 | (2015.01) |
| B29C 33/44 | (2006.01) |
| B29C 39/00 | (2006.01) |
| B29C 39/36 | (2006.01) |
| B29K 83/00 | (2006.01) |
| B29L 31/00 | (2006.01) |
| B29C 39/10 | (2006.01) |
| B29C 64/00 | (2017.01) |
| G09B 23/28 | (2006.01) |

(52) U.S. Cl.
CPC ...... *B29C 33/448* (2013.01); *B29C 45/14065* (2013.01); *B29C 45/14819* (2013.01); *B29C 64/106* (2017.08); *B29C 64/112* (2017.08); *B29C 64/118* (2017.08); *B29C 64/171* (2017.08); *B29C 64/176* (2017.08); *B29C 64/182* (2017.08); *B29C 64/188* (2017.08); *B29C 71/0009* (2013.01); *B33Y 50/00* (2014.12); *B29C 39/003* (2013.01); *B29C 39/10* (2013.01); *B29C 39/36* (2013.01); *B29C 64/00* (2017.08); *B29C 2033/385* (2013.01); *B29K 2083/00* (2013.01); *B29K 2995/0026* (2013.01); *B29K 2995/0029* (2013.01); *B29L 2031/702* (2013.01); *B29L 2031/753* (2013.01); *G09B 23/28* (2013.01)

(58) Field of Classification Search
CPC ........ B29C 45/14065; B29C 45/14819; B29C 64/106; B29C 64/112; B29C 64/118; B29C 64/171; B29C 64/176; B29C 64/182; B29C 64/188; B29C 70/68; B29C 70/70; B29C 71/00; B29C 71/0009; B29K 2995/0026; B29K 2995/0029
USPC ............ 264/162, 219, 232, 278, 279, 279.1, 264/297.1, 297.8, 308, 317, 340, 341
See application file for complete search history.

(56) References Cited

U.S. PATENT DOCUMENTS

| | | |
|---|---|---|
| 2013/0040110 A1 | 2/2013 | Matsui et al. |
| 2013/0085736 A1 | 4/2013 | Reihsen et al. |
| 2015/0025666 A1 | 1/2015 | Olivieri et al. |
| 2016/0346449 A1* | 12/2016 | Roche ................ F15B 15/103 |
| 2017/0239886 A1* | 8/2017 | Norikane ............. B29C 64/112 |

FOREIGN PATENT DOCUMENTS

| | | |
|---|---|---|
| JP | 4481331 B2 | 3/2010 |
| KR | 101016384 B1 | 2/2011 |
| KR | 1020140097378 A | 8/2014 |

* cited by examiner

METHOD OF FORMING TRANSPARENT 3D OBJECT

TECHNICAL FIELD

The present invention relates to a method of forming a transparent three-dimensional (3D) object whose internal structure can be seen, and a transparent 3D object formed by the method.

BACKGROUND ART

Recently, three-dimensional (3D) printers have been widely used to form 3D objects. 3D printing is conceptually the opposite of subtractive manufacturing methods used to form 3D objects by cutting or partially removing materials. That is, 3D printing is an additive manufacturing method used to form 3D objects by adding layers. Various additive techniques are used for 3D printing.

DETAILED DESCRIPTION OF THE INVENTION

Technical Problem

Technical objects of the present invention are to provide a method of forming a transparent three-dimensional (3D) object using a 3D printer to allow for easy inspection of internal structures of the transparent 3D object, and to provide a transparent 3D object formed by the method.

Technical Solution

To achieve the above-described technical objects of the present invention, an embodiment of the present invention provides method of forming a transparent three-dimensional (3D) object, the method including: printing an internal structure of a 3D object using a 3D printer based on a 3D image file having information about an internal region of the 3D object; printing a mold, designed to form the 3D object and divided into at least two regions, by using the 3D printer based on the 3D image file; combining the internal structure with an inner region of the mold; supplying a transparent material to the mold; and removing the mold after the transparent material hardens.

To achieve the above-described technical objects of the present invention, an embodiment of the present invention provides a transparent 3D object including: at least one internal structure formed by 3D printing; and a transparent part formed by pouring a transparent material into a mold in which the at least one internal structure is internally fixed.

To achieve the above-described technical objects of the present invention, an embodiment of the present invention provides a method of forming a transparent 3D object, the method including: receiving a 3D capture image obtained by capturing xy-plane images of a 3D object at regular intervals in a z-axis direction; generating a compensated 3D image by interpolating empty spaces of the 3D capture image in the z-axis direction; generating a 3D image file by converting sets of voxels of the compensated 3D image into polygon data; and providing the 3D image file to a 3D printer for 3D printing.

Advantageous Effects of the Invention

According to the present invention, transparent three-dimensional (3D) objects whose internal structures can be seen may be formed. Particularly, the present invention may be used to form medical 3D objects having high transparency as models of human organs such as the lung or liver having complex blood vessels or tumors, and thus the structures of the human organs may be easily inspected.

MODE OF THE INVENTION

Hereinafter, methods of forming a transparent three-dimensional (3D) object and transparent 3D objects formed by the method will be described in detail according to the present invention with reference to the accompanying drawings.

Figure 1:
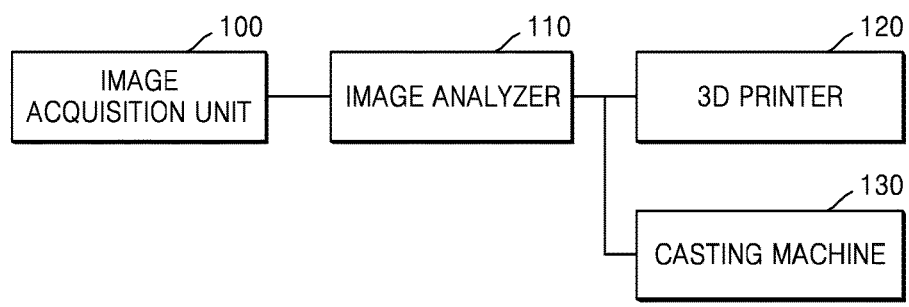
FIG. 1 is a schematic view illustrating a system for forming transparent three-dimensional (3D) objects according to the present invention.

FIG. 1 is a schematic view illustrating a system for forming transparent 3D objects according to the present invention.

Referring to FIG. 1, the transparent 3D object forming system includes an image acquisition unit 100, an image analyzer 110, a 3D printer 120, and a casting machine 130.

The image acquisition unit 100 generates a 3D image of a 3D object. The image acquisition unit 100 generates a 3D image describing the inside of a 3D object as well as the outside of the 3D object. For example, the image acquisition unit 100 may generate a 3D image providing information about the internal structure of a 3D object by using a computed tomography (CT) device or a magnetic resonance imaging (MRI) device. In general, 3D images obtained by CT or MRI are stored in the form of digital imaging and communications in medicine (DICOM) files. In another example, the image acquisition unit 100 may use a method such as computer aided design (CAD) so as to generate a 3D image (CAD file) of a 3D object that a user wants to form.

The image analyzer 110 generates at least one 3D image file based on a 3D image received from the image acquisition unit 100 so as to realize 3D printing. A 3D image captured using CT or MRI has a large amount of noise and does not have surfaces because the 3D image is constituted by sets of voxels. That is, it is impossible to perform 3D printing intactly using the 3D image. Therefore, the image analyzer 110 converts a 3D image into a 3D image file suitable for 3D printing. This will be described later with reference to FIG. 2.

In another example, a 3D image having no noise or not requiring additional surface processing processes may be drawn using a tool such as a CAD tool. In this case, the image analyzer 110 may directly convert the 3D image into a STereoLithography (STL) file that is generally used in 3D printers. In another example, a 3D image may be prepared as a file suitable for 3D printers. In this case, the image analyzer 110 may be omitted.

In an embodiment, the image analyzer 110 may extract a volume of interest (VOI) for forming a transparent 3D object from a 3D image and may generate a 3D image file using the VOI. Here, the VOI refers to a region to be formed as a transparent 3D object.

The 3D printer 120 performs a 3D printing process based on the 3D image file received from the image analyzer 110. According to an embodiment, one of various kinds of 3D printers of the related art using various methods may be used as the 3D printer 120, and thus a detailed description of the 3D printer 120 will not be presented here.

The casting machine 130 provides a production environment for a transparent 3D object. In this production environment, a structure formed by the 3D printer 120 is positioned inside a mold and a transparent material is supplied to the mold so as to form the transparent 3D object. For example, when a dissolved transparent material is supplied to the mold, bubbles having a negative effect on transparency may be formed. To prevent this, the casting machine 130 may include a chamber in which a vacuum is formed or a gas such as argon gas or nitrogen gas is filled. The casting machine 130 may be variously modified or may be omitted according to embodiments.

Figure 2:
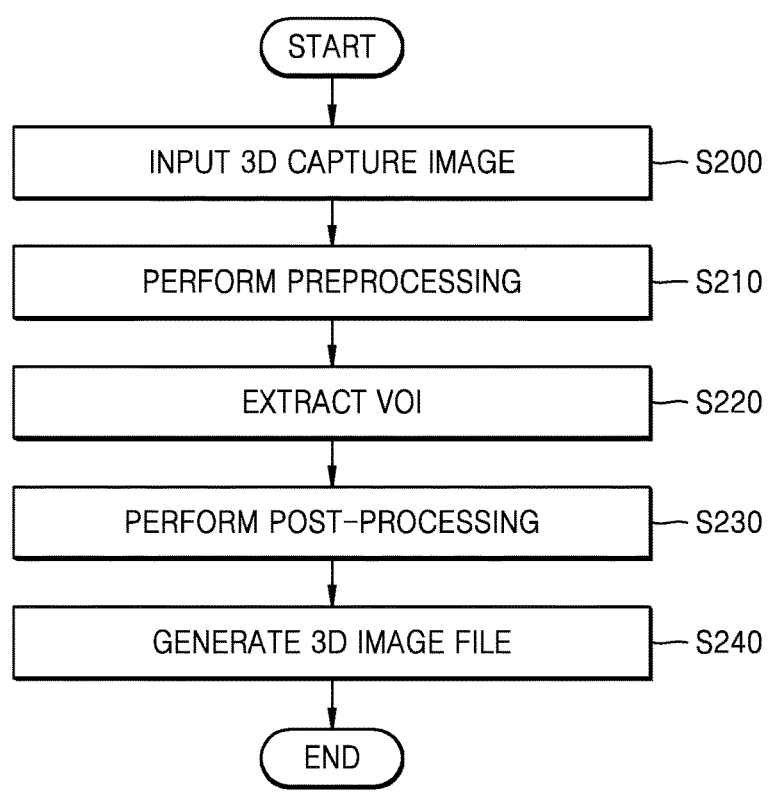
FIG. 2 is a flowchart illustrating operations of an image analyzer for forming a transparent 3D object according to an embodiment of the present invention.

FIG. 2 is a flowchart illustrating operations of the image analyzer 110 for forming a transparent 3D object according to an embodiment of the present invention.

Referring to FIG. 2, the image analyzer 110 receives a 3D image from the image acquisition unit 100 (S200). The 3D image may be a CT or MRI image of a human body part or an image drawn by a user using a tool such as a CAD tool.

The image analyzer 110 may perform a preprocessing process such as a noise removing process on the 3D image (S210). The preprocessing process may be performed using an algorithm or method such as a Gaussian filter, an anisotropic diffusion filter, or a total variation minimization (TVM) method. If the 3D image is a CAD image or the like, the 3D image may have less noise than CT or MRI images, and thus the preprocessing process may be omitted.

Figure 3:
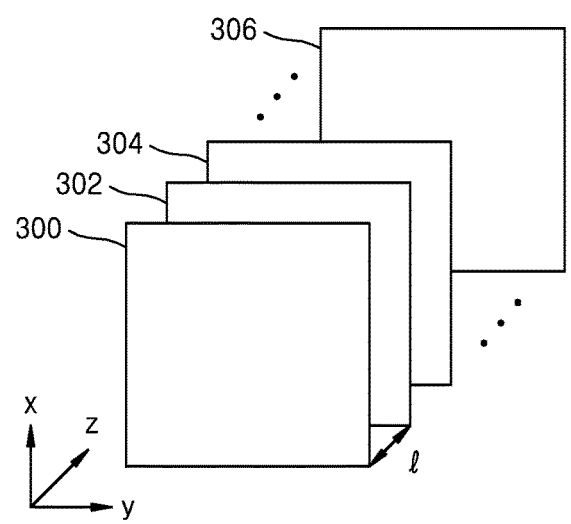
FIG. 3 is a view illustrating an example of a 3D image including a plurality of 2D images according to the present invention.

As shown in FIG. 3, a CT or MRI 3D image may include xy-plane images 300, 302, 304, and 306 captured at regular intervals in an z-axis direction, and thus intervals 1 in which images are not captured are present in the z-axis direction. In this case, the image analyzer 110 may perform a preprocessing process according to an interpolation method so as to generate a compensated image having improved z-axis resolution. For example, the image analyzer 110 may use an interpolation method such as an isotropic conversion method or a frame rate up-conversion method so as to improve z-axis resolution. Besides the listed methods, the image analyzer 110 may use any other interpolation method.

After the preprocessing process, the image analyzer 110 may extract a VOI from the 3D image (S220). For example, if a 3D image of a 3D object such as a pencil or key is generated using a CAD tool, the 3D image may be directly converted into a 3D image file and printed out, and thus an addition process of extracting a VOI may not be performed. If it is intended to form a transparent 3D object as a model of a part of a 3D object such as a pencil or key, the image analyzer 110 may extract a VOI from the 3D image.

In another example, if it is intended to form a transparent 3D object as a model of a particular human organ such as the liver or lung using a CT or MRI 3D image of the human organ, the image analyzer 110 may extract a VOI corresponding to the liver or lung from the 3D image.

The image analyzer 110 may include a user interface through which a user can set a VOI. For example, the 3D image may be displayed on a screen, and a user may select a VOI from the 3D image using an input device such as a mouse. For example, a VOI may have a round shape such as the liver or lung. In this case, if a user selects a region including the liver or lung from the 3D image, the image analyzer 110 may automatically extract the liver or lung from the region by any method of the related art. Examples of methods for precisely extracting a human body part such as the lung are disclosed in Korean Patent Application Nos. 10-2013-91595 and 10-2013-124155, and thus methods may be used in the present invention.

Figure 5:
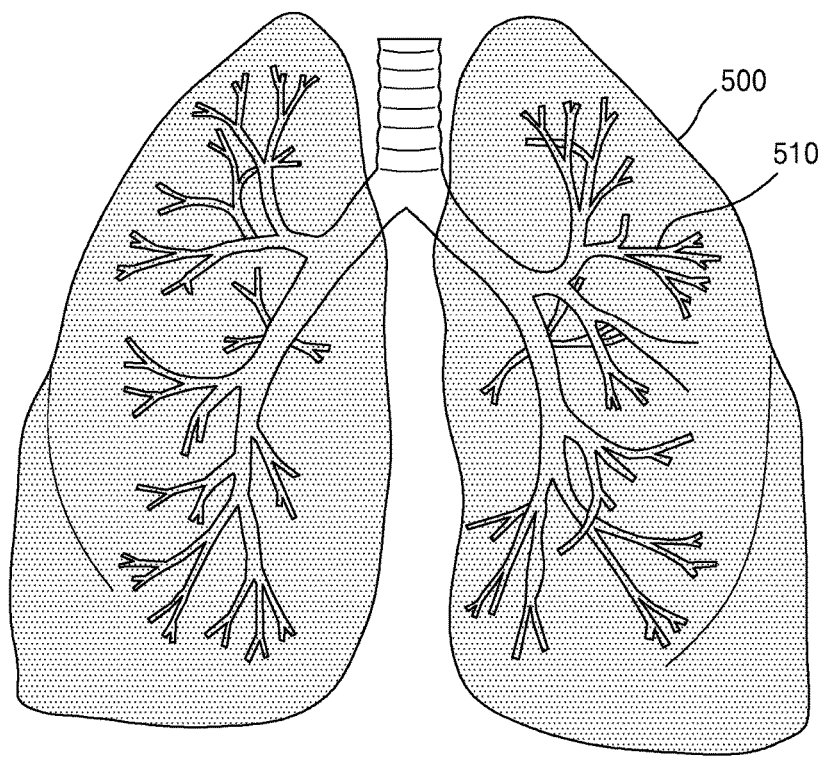
FIG. 5 is a view illustrating an example of extracting a volume of interest (VOI) from a 3D image according to the present invention.

When extracting a VOI, the image analyzer 110 may separate various internal structures of the VOI for 3D printing. For example, as shown in FIG. 5, if a lung 500 is extracted as a VOI from a 3D image of a human body, the image analyzer 110 may separate internal structures 510 such as blood vessels, tumors, or bronchial tubes from the VOI.

The image analyzer 110 performs a post-processing process such as a noise removing process on the VOI and at least one of the internal structures 510 (S230). The post-processing process may be omitted according to embodiments.

The image analyzer 110 generates 3D image files of the VOI and the internal structures 510 (S240). For example, the image analyzer 110 may generate a 3D image file by converting sets of voxels constituting a CT or MRI image into sets of 3D coordinates having a mesh structure of dots, lines, and surfaces (that is, polygon data). In another example, if the 3D image is constituted by sets of 3D coordinates, the above-described process may be omitted.

Figure 6:
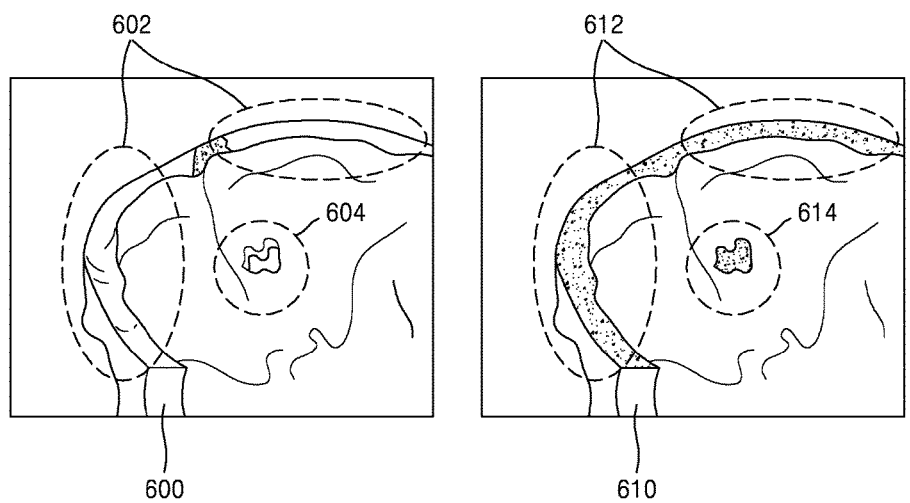
FIG. 6 is a view illustrating an example of repairing meshes of a 3D image file according to the present invention.

In addition, as shown in FIG. 6, when voxel-based volume data is converted into polygon data, a hole 604 or flip surfaces 602 may be present (refer to the left image 600). In this case, the image analyzer 110 may detect defective mesh portions such as the hole 604 and may perform a mesh repairing process to repair the defective mesh portions (refer to repaired portions 612 and 614 in the right image 610).

Figure 4:
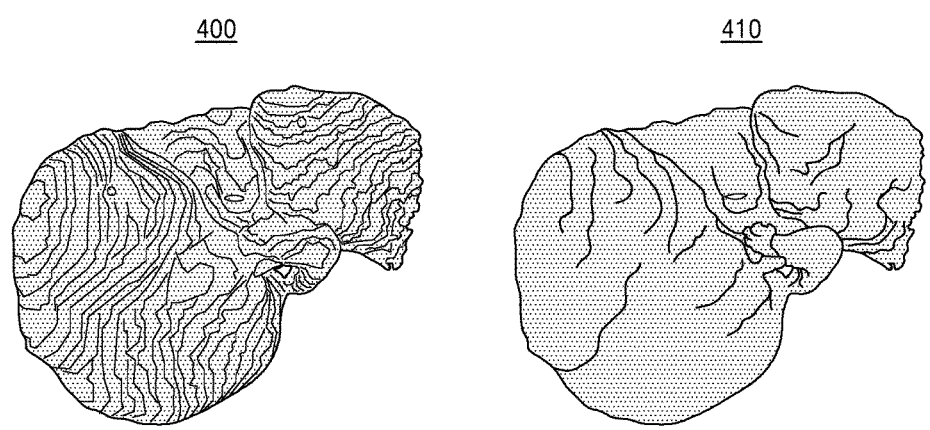
FIG. 4 is a view illustrating states of a 3D image such as the 3D image shown in FIG. 3 before and after interpolating the z-axis resolution of the 3D image.

FIG. 3 illustrates an example of a 3D image including a plurality of two-dimensional (2D) images 300, 302, 304, and 306, and FIG. 4 illustrates a 3D image before and after interpolating the z-axis resolution of the 3D image such as the 3D image of FIG. 3.

Referring to FIG. 3, the image acquisition unit 100 acquires a 3D image including a plurality of xy-plane images captured by CT or MRI at regular intervals in a z-axis direction. In this case, since the xy-plane images are separated by a predetermined distance in the z-axis direction, image information does not exist in the predetermined distance.

Referring to FIG. 4, the 3D image shown in FIG. 3 is rendered as a 3D image 400 without interpolating the z-axis resolution of the 3D image and as a 3D image 410 by interpolating the z-axis resolution of the 3D image. The 3D image 410 has a smoother shape owing to a z-axis resolution interpolation performed by the image analyzer 110.

FIG. 5 illustrates an example of extracting a VOI from a 3D image according to the present invention.

Referring to FIG. 5, the image analyzer 110 may extract a lung region 500 from a 3D image of a human body. In this case, the image analyzer 110 may separate regions of internal structures 510 such as blood vessels or bronchial tubes from the lung region 500.

FIG. 6 illustrates an example of repairing meshes of a 3D image file according to the present invention.

Referring to FIG. 6, when a 3D image composed of voxels, such as a CT image, is converted into a 3D image file composed of polygon data, error regions 602 and 604 such as holes may be present. Therefore, the image analyzer 110 may performs a mesh repairing process to generate smooth regions 612 and 614 by correcting the error regions 602 and 604.

Figure 7:
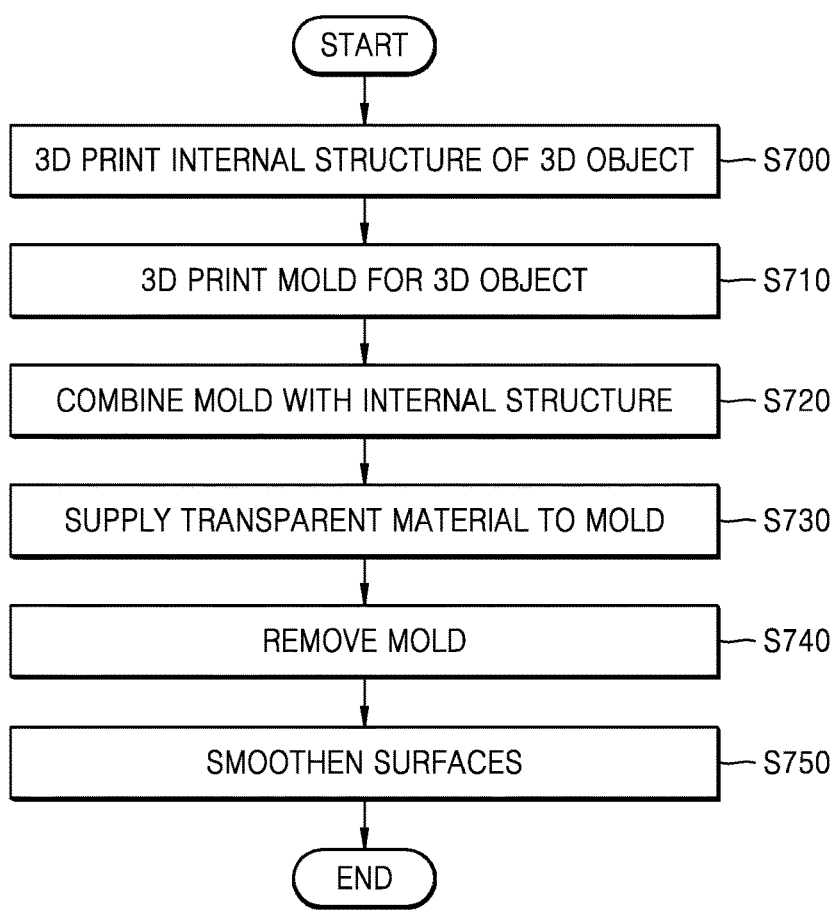
FIG. 7 is a flowchart illustrating an example of a method of forming a transparent 3D object according to the present invention.

FIG. 7 is a flowchart illustrating an example of a method of forming a transparent 3D object according to the present invention. In the example, it is assumed that a 3D image file is generated through the above-described processes.

Referring to FIG. 7, an internal structure is printed using a 3D printer based on a 3D image file describing the inside of a 3D object (S700). In this case, if the internal structure is a blood vessel or a bronchial tube of a lung as described with reference to FIG. 5, supports for supporting the internal structure may also be printed when the internal structure is 3D printed. The supports are separated and removed from the internal structure after the internal structure is printed. For example, the supports may be printed using a material soluble in a particular chemical, and after printing, the supports may be removed by dissolving the supports in the particular chemical.

Next, instead of the 3D object, a mold for the 3D object is printed using the 3D printer based on the 3D image file of the 3D object (S710). For example, the image analyzer 110 may reverse the 3D image file of the 3D object to generate a 3D image file describing the 3D object as an empty space and a region surrounding the 3D object as a solid region. Then, the 3D printer (120) may print a mold for the 3D object using the reversed 3D image file.

Figure 10:
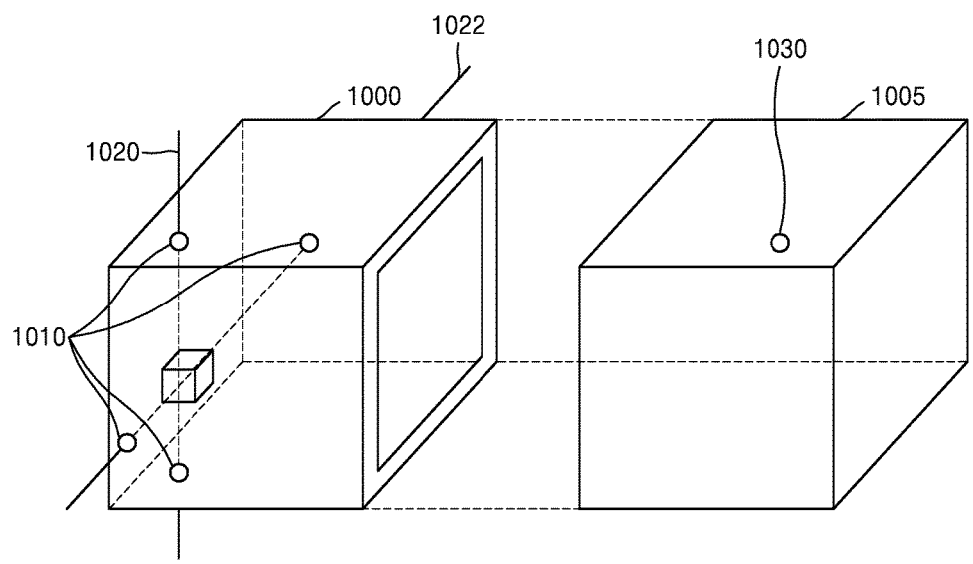
FIG. 10 is a view illustrating an example of a mold for forming a 3D object including an independent structure according to the present invention.

The mold may be 3D printed after being divided into at least two parts, so as to easily combine the mold with the internal structure. For example, a mold for a hexahedral 3D object shown in FIG. 8 may be divided into two parts 1000 and 1005 as shown in FIG. 10 and then may be 3D printed.

Next, the mold and the internal structure formed by the 3D printer are combined (S720). The internal structure may be a structure contacting an outer surface of the 3D object (that is, an inner surface of the mold) or a independent structure not contacting the 3D object. If the internal structure is a structure contacting an outer surface of the 3D object, the internal structure may easily be fixed to a side of the mold, for example, using an adhesive. If the internal structure is a structure penetrating an outer surface of the 3D object and protruding outward, the 3D printer may perform printing until a portion of the internal structure penetrating the outer surface of the 3D object is formed, and the mold may be 3D printed in such a manner that the mold includes an internal structure penetrating portion. Then, the mold and the internal structure may easily be combined with each other like toy blocks. If the internal structure is an independent structure, additional parts such as supports may be required to fix the internal structure. This will be described later with reference to FIGS. 9 to 11.

After combining the mold and the internal structure (S720), a transparent material is dissolved and supplied to the mold (S730). The transparent material may be any transparent material such as a transparent synthetic resin or silicone. When the transparent material is supplied to the mold, a transparency decrease caused by bubbles or the like may be prevented by performing the transparent material supplying process and a subsequent hardening process in a chamber of a molding device in which a vacuum is formed or gas such as argon gas is filled.

After the transparent material hardens, the mold is removed (S740). If the 3D object has many small and complicated surface portions, the mold may not be easily removed or a portion of the 3D object may be separated together with the mold. To prevent this, according to an embodiment, the mold may be 3D printed using a material soluble in a certain chemical, and the mold may be removed by exposing the mold to the certain chemical.

According to an embodiment, after the mold is removed, a surface smoothening process may be performed on a transparent 3D object (S750). For example, the surface of the transparent 3D object may be smoothened using sandpaper, vapor of an acetone solution, an epoxy resin coating, a fine paint surface material, or a finishing material.

Figure 8:
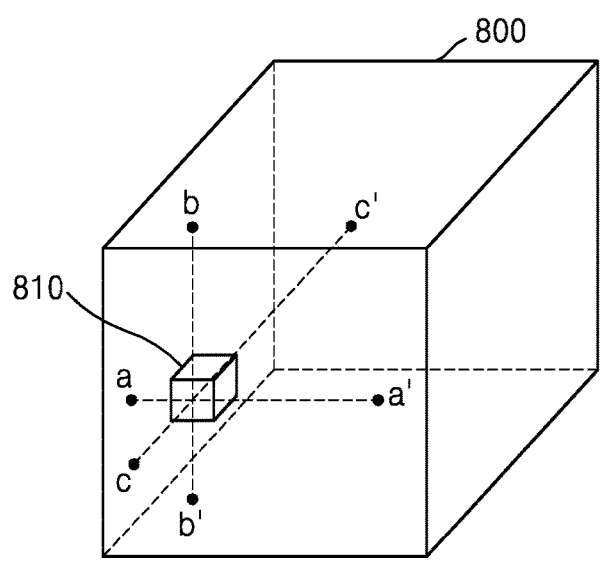
FIG. 8 is a view illustrating an example of a transparent 3D object formed according to the present invention.

FIG. 8 illustrates an example of a transparent 3D object formed according to the present invention.

Referring to FIG. 8, the transparent 3D object includes an internal structure 810 formed using a 3D printer and a transparent part 800 formed using a mold. For example, if a transparent 3D object is formed as a model of a human organ such as a lung or liver, it may be easy to observe the positions and sizes of parts such as blood vessels, bronchial tubes, or tumors with the naked eye as well as the overall shape of the human organ. Thus, such transparent 3D objects may be useful in medical applications such as surgical operations or anatomy education.

Referring to FIG. 8, the internal structure 810 located inside the transparent 3D object is an independent structure not making contact with a surface of the transparent 3D object. Therefore, when the mold and the internal structure 810 are combined according to the method described with reference to FIG. 7, a technique for precisely positioning an independent structure is necessary. This will now be described with reference to FIG. 9.

Figure 9:
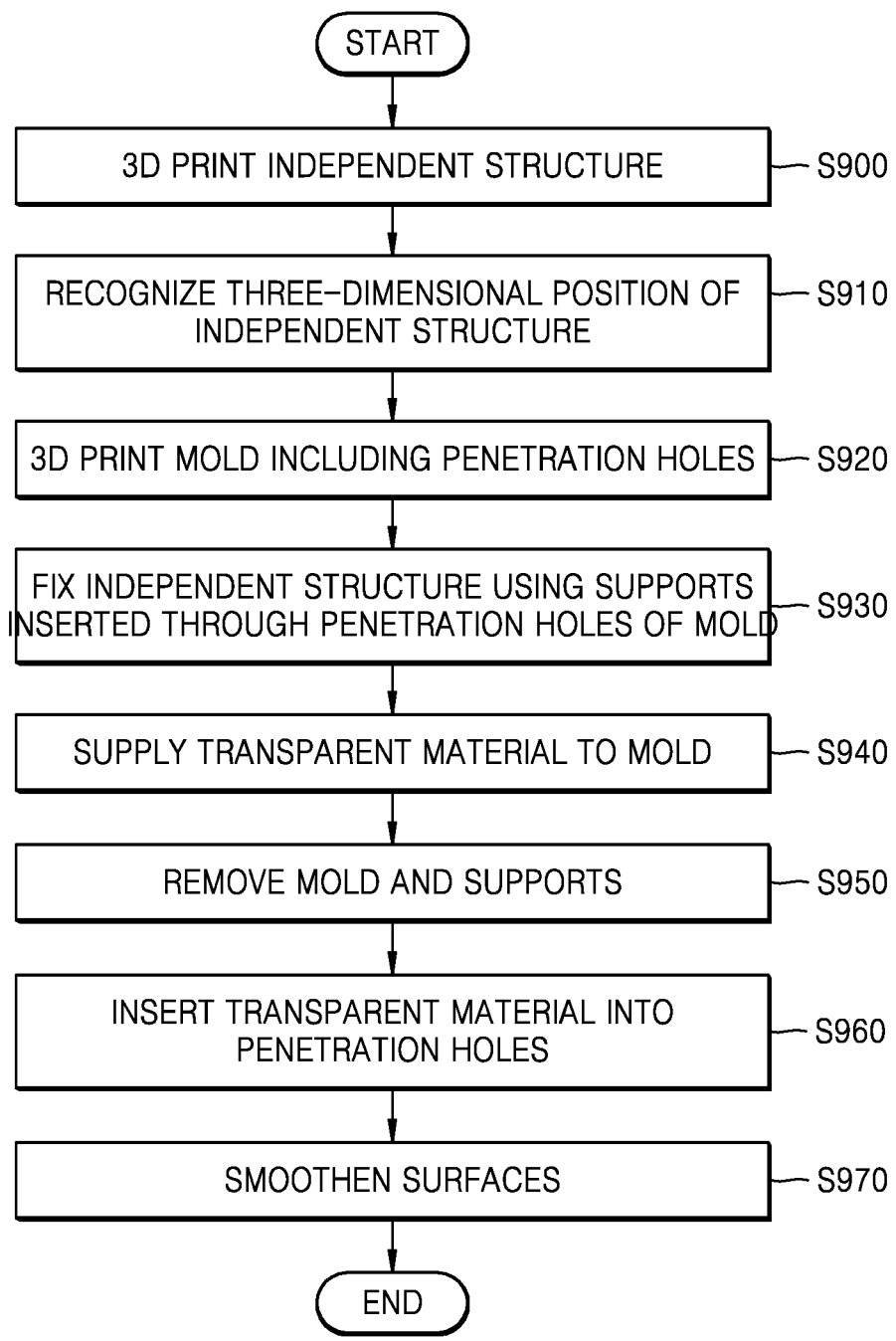
FIG. 9 is a view illustrating an example of a method of forming a transparent 3D object including an independent structure according to the present invention.

FIG. 9 illustrates an example of a method of forming a transparent 3D object including an independent structure according to the present invention.

Referring to FIGS. 8 and 9, a 3D printer prints an independent structure 810 based on a 3D image file (S900). If there are other internal structures, the 3D printer may also print the other internal structures. For example, when a transparent 3D object is formed as a model of the liver of a liver cancer patient, the 3D printer may print a lump of cancer separate from the liver as well as blood vessels located in the liver.

An image analyzer recognizes a three-dimensional position of the independent structure based on the 3D image file (S910). The three-dimensional position of the independent structure may be expressed as a point at which at least two imaginary lines cross each other. The image analyzer generates a 3D image file for a mold having penetration holes through which imaginary lines pass, and the 3D printer prints the mold (S920). For example, as shown in FIG. 10, the 3D printer may print a mold having penetration holes 1010 through which two imaginary lines 1020 and 1022 pass so as to indicate the position of the independent structure 810 shown in FIG. 8.

Next, the independent structure 810 is fixed by inserting supports through the penetration holes of the mold (S930), and a transparent material is supplied to the mold through a mold inlet (S940). After the transparent material hardens, the mold and the supports are removed (S950). After removing the supports, the penetration holes are left unfilled or filled with the same material as the transparent material supplied to the mold (S960). The surface smoothening process described with reference to FIG. 7 may be optionally performed according to an embodiment (S970).

FIG. 10 illustrates an example of a mold for forming a transparent 3D object including an independent structure according to the present invention.

Referring to FIG. 10, parts 1000 and 1005 of a mold for forming the 3D object 800 shown in FIG. 8 are illustrated. The mold is 3D printed, and the mold is divided into at least two parts 1000 and 1005 for easily coupling the internal structure 810. A mold inlet 1030 is formed in a side of the mold to receive a transparent material.

The parts 1000 and 1005 of the mold include penetration holes 1010, and thus at least two supports 1020 and 1022 may be inserted through the penetration holes 1010 to support the independent structure 810 shown in FIG. 8. The independent structure 810 is placed at a point at which the supports 1020 and 1022 inserted through the penetration holes 1010 cross each other.

The independent structure 810 is fixed using the supports 1020 and 1022, and the parts 1000 and 1005 of the mold are combined together. Then, a transparent material is poured through the mold inlet 1030 to form a transparent 3D object through which the internal structure 810 can be seen as illustrated in FIG. 8. When the two parts 1000 and 1005 of the mold are combined together, any method known in the related art may be used to prevent leakage of the transparent material.

Figure 11:
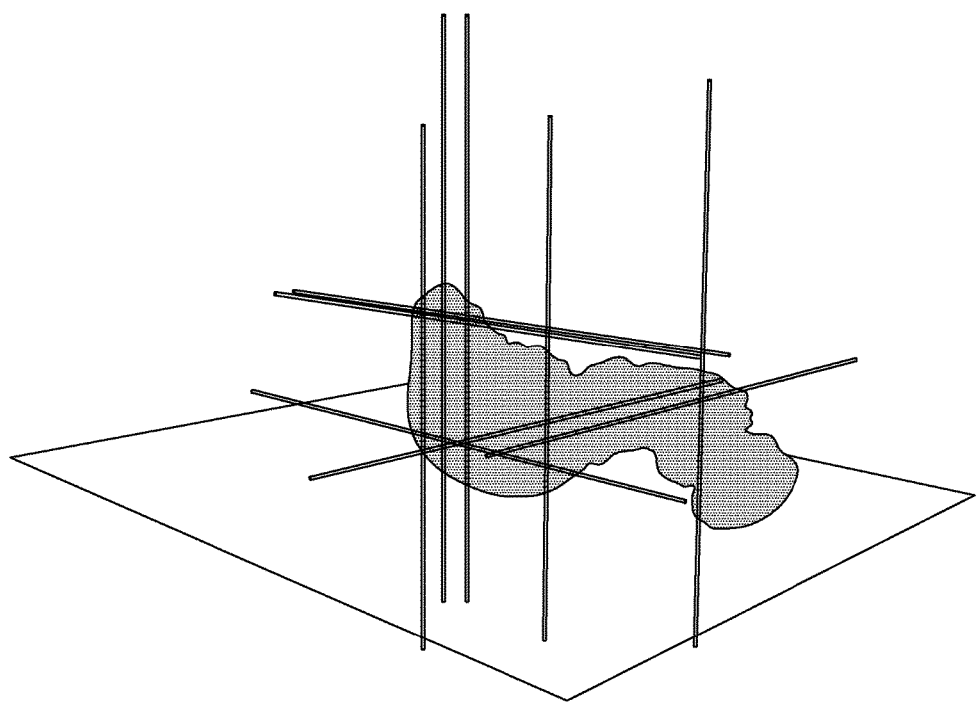
FIG. 11 is a view illustrating an example of a method of fixing an independent structure according to the present invention.

FIG. 11 illustrates an example of a method of fixing an independent structure according to the present invention.

Referring to FIG. 11, if the independent structure is large, the independent structure may not be fixed using a pair of supports as shown in FIG. 8. In this case, an image analyzer detects a three-dimensional position of the independent structure and generates a plurality of imaginary lines passing through the independent structure. Then, a mold including penetration holes through which the imaginary lines pass is formed. Thereafter, the independent structure is fixed using supports inserted through the penetration holes of the mold, and a transparent 3D object is formed by the above-described method.

The present invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage. The computer readable recording medium can also be distributed over network coupled computer systems so that the computer readable codes are stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of forming a transparent three-dimensional (3D) object, the method comprising:
    printing an internal structure of a 3D object using a 3D printer based on a 3D image file having information about an internal region of the 3D object;
    printing a mold, designed to form the 3D object and divided into at least two regions, by using the 3D printer based on the 3D image file;
    combining the internal structure with an inner region of the mold;
    supplying a transparent material to the mold; and
    removing the mold after the transparent material hardens,
    wherein the printing of the internal structure comprises 3D printing an independent structure separate from an outer surface of the 3D object and located in the 3D object,
    wherein the printing of the mold comprises:
    detecting a three-dimensional position of the independent structure located in the 3D object based on the 3D image file; and
    3D printing the mold comprising penetration holes, the penetration holes corresponding to at least two imaginary lines crossing at the three-dimensional position,
    wherein the supplying of the transparent material comprises supplying the transparent material to the mold after fixing the independent structure using supports inserted through the penetration holes, the independent structure being fixed to a point at which the supports cross each other,
    wherein the removing of the mold comprises:
    removing the supports; and
    inserting the transparent material into the penetration holes from which the supports are removed.

2. A method of forming a transparent three-dimensional (3D) object, the method comprising:
    printing an internal structure of a 3D object using a 3D printer based on a 3D image file having information about an internal region of the 3D object;
    printing a mold, designed to form the 3D object and divided into at least two regions, by using the 3D printer based on the 3D image file;
    combining the internal structure with an inner region of the mold;
    supplying a transparent material to the mold; and
    removing the mold after the transparent material hardens,
    wherein the 3D image file is prepared by capturing xy-plane images of the 3D object at regular intervals in a z-axis direction to obtain a 3D image of the 3D object, interpolating empty spaces of the 3D image in the z-axis direction, and converting sets of voxels of the interpolated 3D image into polygon data.

3. The method of claim 1, wherein the printing of the internal structure comprises:
    detecting at least two internal structures located in the 3D object based on the 3D image file; and
    3D printing the at least two internal structures using printing materials having different colors.

4. The method of claim 1, wherein the 3D object is an human organ, and
   the internal structure comprises at least one of blood vessels, tumors, and bronchial tubes of the human organ.

5. The method of claim 1, wherein the printing of the mold comprises printing the mold using a material soluble in a predetermined chemical.

6. The method of claim 1, further comprising smoothening a surface of a 3D object remaining after the mold is removed, by using at least one of sandpaper, vapor of an acetone solution, an epoxy resin coating, and a finishing material.

7. The method of claim 2, wherein the printing of the internal structure comprises:
   detecting at least two internal structures located in the 3D object based on the 3D image file; and
   3D printing the at least two internal structures using printing materials having different colors.

8. The method of claim 2, wherein the 3D object is an human organ, and
   the internal structure comprises at least one of blood vessels, tumors, and bronchial tubes of the human organ.

9. The method of claim 2, wherein the printing of the mold comprises printing the mold using a material soluble in a predetermined chemical.

10. The method of claim 2, further comprising smoothening a surface of a 3D object remaining after the mold is removed, by using at least one of sandpaper, vapor of an acetone solution, an epoxy resin coating, and a finishing material.

\* \* \* \* \*